United States Patent [19]

Retallack

[11] 3,829,631
[45] Aug. 13, 1974

[54] ELECTRIC RAILROAD SYSTEM WITH ELEVATED CONDUCTOR ALONGSIDE THE TRACK

[76] Inventor: Robert L. Retallack, 510 Fairfield Ave., Ridgewood, N.J. 07450

[22] Filed: May 18, 1972

[21] Appl. No.: 254,616

[52] U.S. Cl.................. 191/66, 191/32, 191/40
[51] Int. Cl............................................. B60l 5/12
[58] Field of Search............. 191/22, 29, 32, 33, 45, 191/47, 48, 49, 50, 53, 57, 59, 59.1, 60.2, 60.3, 60.5, 64–70

[56] References Cited
UNITED STATES PATENTS

| 574,632 | 1/1897 | Schlesinger | 191/53 |
|---|---|---|---|
| 590,527 | 9/1897 | Kenway | 191/53 |
| 749,042 | 1/1904 | Eader | 191/49 |
| 1,747,489 | 2/1930 | Schaake | 191/70 |
| 2,935,576 | 5/1960 | Faiveley | 191/68 |
| 3,712,430 | 1/1973 | Charamel | 191/49 |
| 3,730,311 | 5/1973 | Maison | 191/49 |

Primary Examiner—M. Henson Wood, Jr.
Assistant Examiner—D. W. Keen
Attorney, Agent, or Firm—Pennie & Edmonds

[57] ABSTRACT

In this electric railroad system, the elevated contact conductor is mounted primarily alongside the track, with sections extending over the track and then back alongside the track at grade crossings, railraod crossings, switch locations, transition locations where the conductor is transferred to the opposite side of the track, etc. The electrically-powered vehicle has an overhead traveler mounted on an extensible arm for obtaining power from the contact conductor. The arm is pivotally mounted on top of the vehicle for movement about an axis of rotation extending longitudinally of the vehicle, and also allows the traveler to move toward and away from the axis of rotation so that the traveler can follow changes in position of the contact conductor while remaining in engagement therewith. In the specific embodiments, the traveler has pairs of grooved wheels engaging opposite sides of the conductor and the arm is articulated to maintain substantially the same orientation of the traveler with respect to a radius to the axis of rotation of the arm as the traveler follows changes in position of the contact conductor. Sections of the conductor over the track may rise to a higher level than alongside sections. At a switching location a fixed conductor frog mounted beyond the track switching point and having angled guide channels for the traveler may be employed.

12 Claims, 24 Drawing Figures

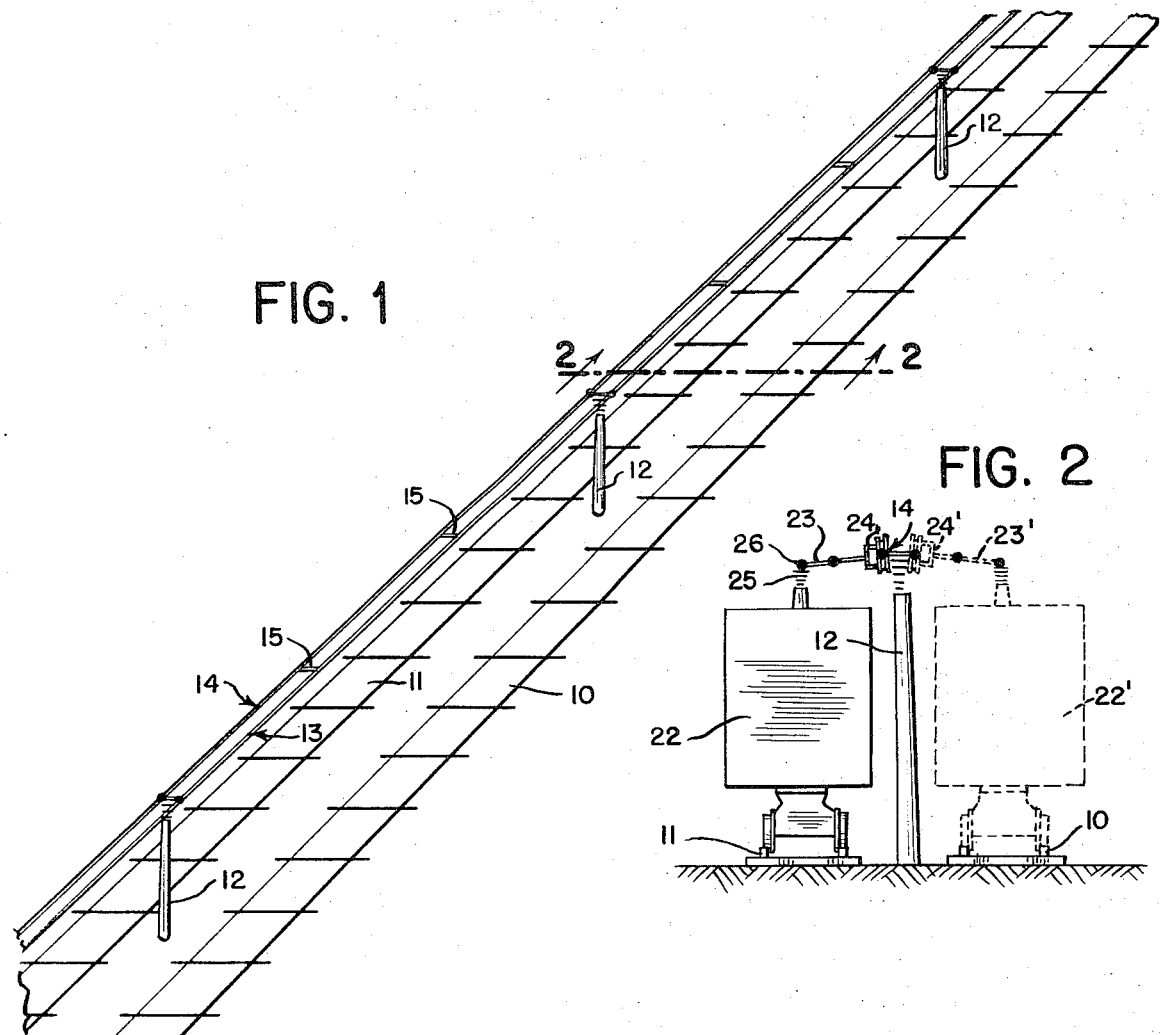
FIG. 1
FIG. 2
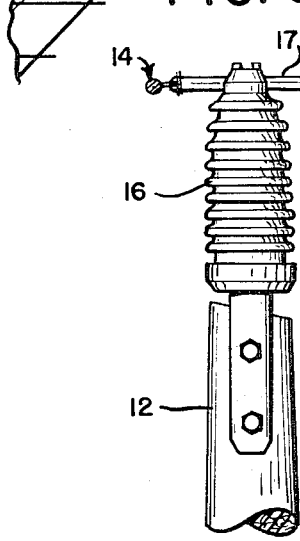
FIG. 3
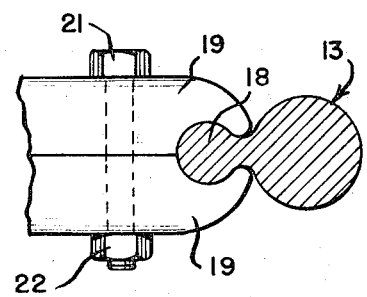
FIG. 4
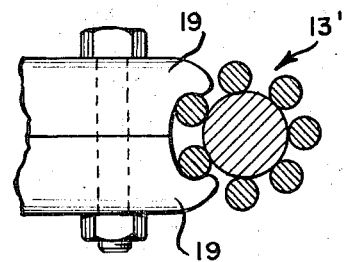
FIG. 4a

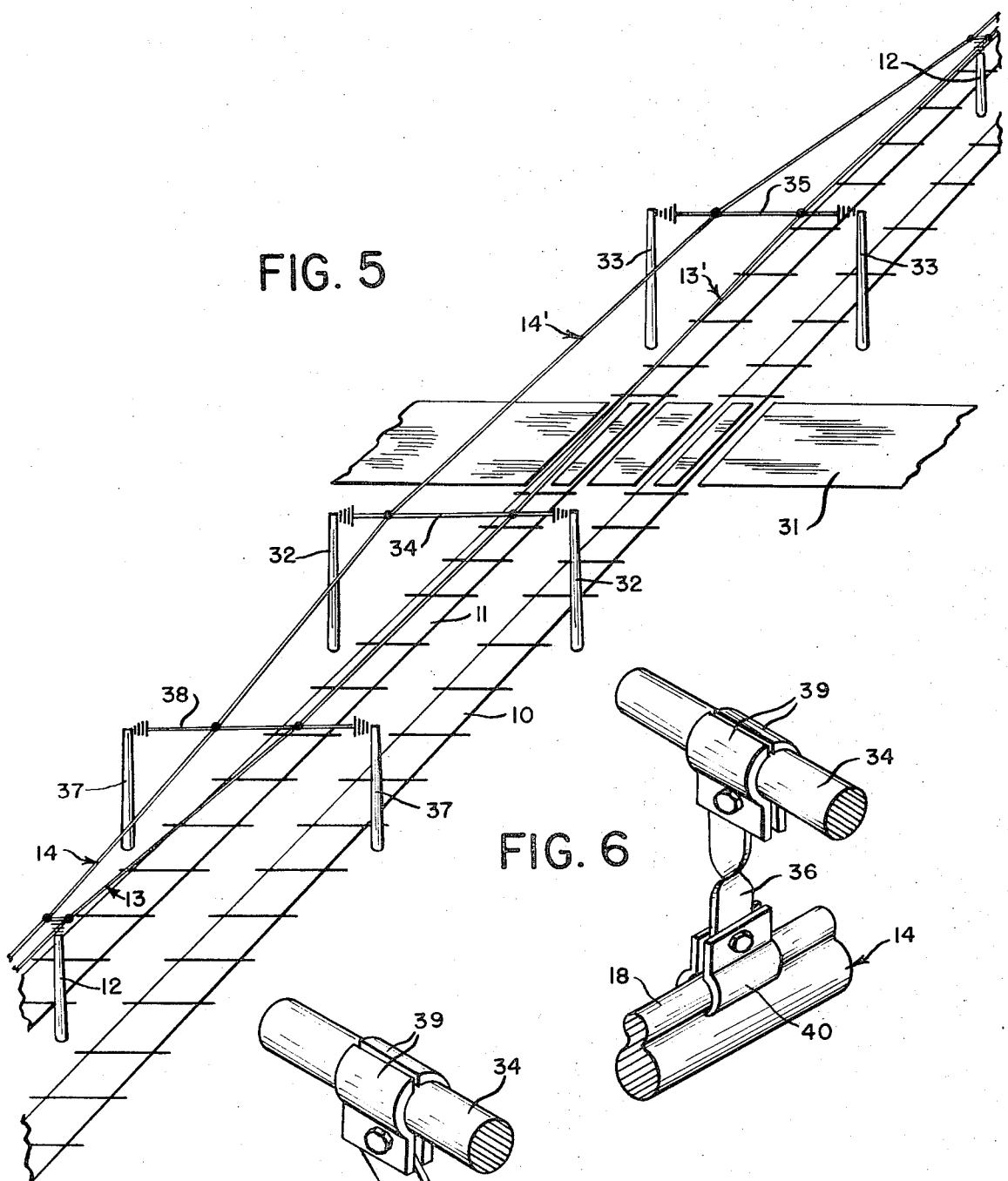

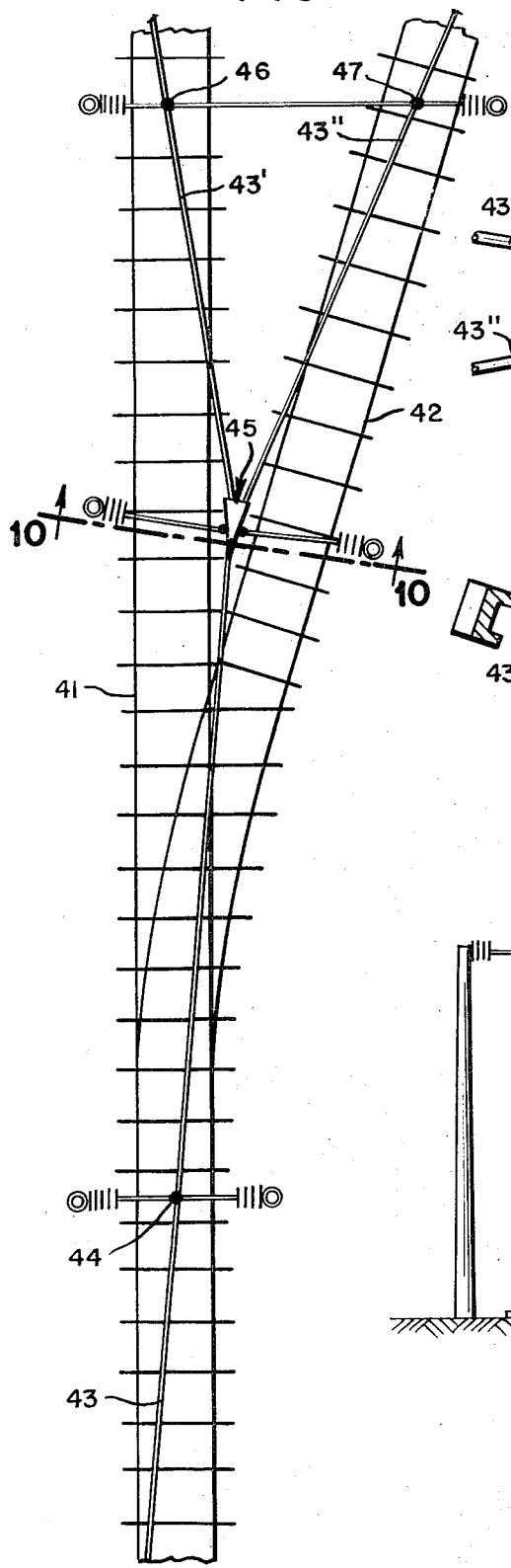
FIG. 7
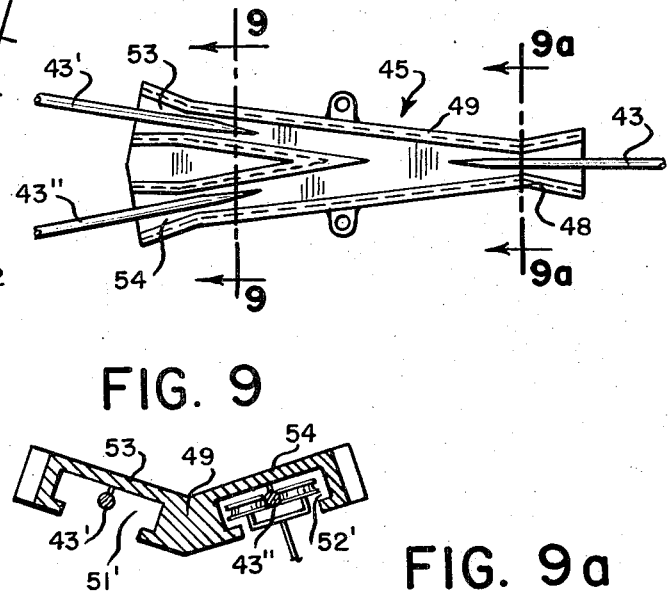
FIG. 8
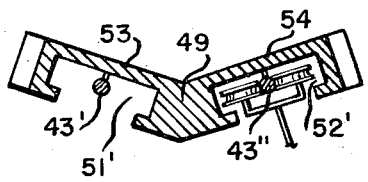
FIG. 9
FIG. 9a
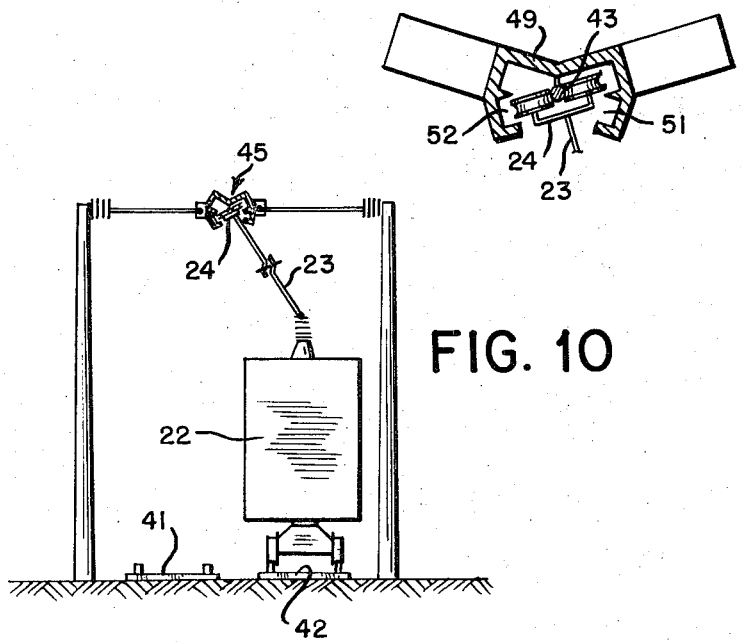
FIG. 10

ELECTRIC RAILROAD SYSTEM WITH ELEVATED CONDUCTOR ALONGSIDE THE TRACK

BACKGROUND OF THE INVENTION

Electric railroad systems with overhead power conductors engaged by trolley wheels or by pantograph mounted lateral conductor shoes have been known for many years. For high speed systems, the overhead contact conductor is commonly under high mechanical tension, and supported at a uniform height centrally over the track by a catenary suspension system and frequent supporting structures extending over the track. A major cost in electrifying a railroad is the cost of the overhead catenary system and associated support structures.

Third rails at the side of the track near ground level are also in use in protected locations and at relatively low voltages, but are inherently more dangerous than overhead systems.

There also have been proposals for mounting an elevated contact conductor alongside a track, but in general the vehicle trolley or other current collecting arrangements do not provide for track switching points or for transfer of the conductor from one side of the track to the other, and to positions over the track, as may be required in practical railroad systems, while still maintaining delivery of power to the vehicle.

It is a principal object of the present invention to provide an elevated contact conductor system and vehicle power collecting arrangement which will substantially reduce the cost of electrifying a railroad, while providing for switching, cross-overs, grade crossings, etc. as required in a given system.

SUMMARY OF THE INVENTION

In accordance with the invention, an elevated contact conductor is mounted primarily alongside the track, with sections as required extending over the track and then back alongside the track. Sections of contact conductor over the track may be used, for example, at grade crossings to allow clearance for highway traffic, at railroad crossings if such exist, at transition locations where necessary to transfer the contact conductor from one side of the track to the other, at switch locations, etc.

Electrically-powered vehicles such as locomotives and self-powered cars are provided with an overhead traveler mounted on an extensible arm for obtaining power from the contact conductor. The extensible arm is pivotally mounted on top of the vehicle for movement about an axis of rotation extending longitudinally of the vehicle, and the traveler includes means for engaging the conductor and holding the traveler in guided relationship therewith. The extensible arm is adapted for movement of the traveler toward and away from the axis of rotation of the arm. Thus the traveler can move to either side of the vehicle and to a central position over the vehicle, and also in and out, to follow changes in position of the contact conductor while remaining in engagment therewith.

With this arrangement it is believed that some sag in the conductor between support poles will be allowable, so that high mechanical tension in the conductor and lengthwise supporting cables will be unnecessary. Such support may be employed if desired, but in general may be less elaborate and expensive than for centrally located overhead conductors of the presently known systems.

It is particularly contemplated that the height of the conductor when alongside the track will be such that the traveler arm will be generally horizontal or at a small angle above the horizontal, thus allowing the traveler to rise and fall to accommodate sag in the conductor. At grade crossings, transitions to the opposite side of the track, etc., the height of the conductor may be increased and the conductor brought over the track, the traveler arm swinging over the vehicle and extending as required so as to maintain the traveler in engagement with the conductor.

At switching locations, the conductor may be brought to a position centrally over the track and a conductor switching frog employed to switch fron one position to the other. Or, as described in the specific embodiments, a fixed conductor frog may be located overhead beyond the track switching point and intermediate the centers of the tracks, so that the traveler and arm will swing to positions on opposite sides of the vehicle depending on which track it is following. Thus the pull on the traveler will guide it to the proper outlet leg of the frog. Advantageously the frog is provided with a pair of guide channels at respective angles corresponding to the traveler angles of vehicles traveling down respective tracks.

Preferably the traveler and arm are designed to maintain the same orientation of the traveler with respect to a radius to the axis of rotation of the arm as the traveler moves between side and central positions of the vehicle and toward and away from the axis of rotation. An articulated arm is described hereinafter which accomplishes this result. Preferably the traveler includes grooved means for engaging the conductor on opposite sides thereof and resiliently biased against the conductor, and pairs of grooved wheels longitudinally spaced along the conductor are particularly described hereinafter. The plane of the wheels is advantageously perpendicular to a radius to the axis of rotation of the arm so that the traveler can readily follow changes in position of the elevated conductor in either direction of movement of the vehicle.

BRIEF DESCRIPTION OF THE DRAWINGS

FIG. 1 illustrates a double track railroad with elevated contact conductors mounted alongside respective tracks on a single set of poles;

FIG. 2 is an end view of a pair of vehicles having travelers engaging respective elevated conductors and supported on extensible swinging arms;

FIGS. 3, 4 and 4a illustrate means for mounting the conductors alongside the tracks;

FIG. 5 illustrates a highway grade crossing wherein the conductors are raised to a higher level and positioned centrally of the tracks;

FIG. 6 illustrates means for mounting the conductor centrally of a track, and FIG. 6a illustrates angular mounting between alongside and central positions;

FIG. 7 illustrates a conductor arrangement at a switching location;

FIG. 8 is a bottom view of the frog used in FIG. 7;

FIGS. 9 and 9a are cross-sections of the frog taken along the lines 9—9 and 9a—9a of FIG. 8;

FIG. 10 illustrates a vehicle passing the switch at 10—10 in FIG. 7;

DESCRIPTION OF THE SPECIFIC EMBODIMENTS

Figure 11:
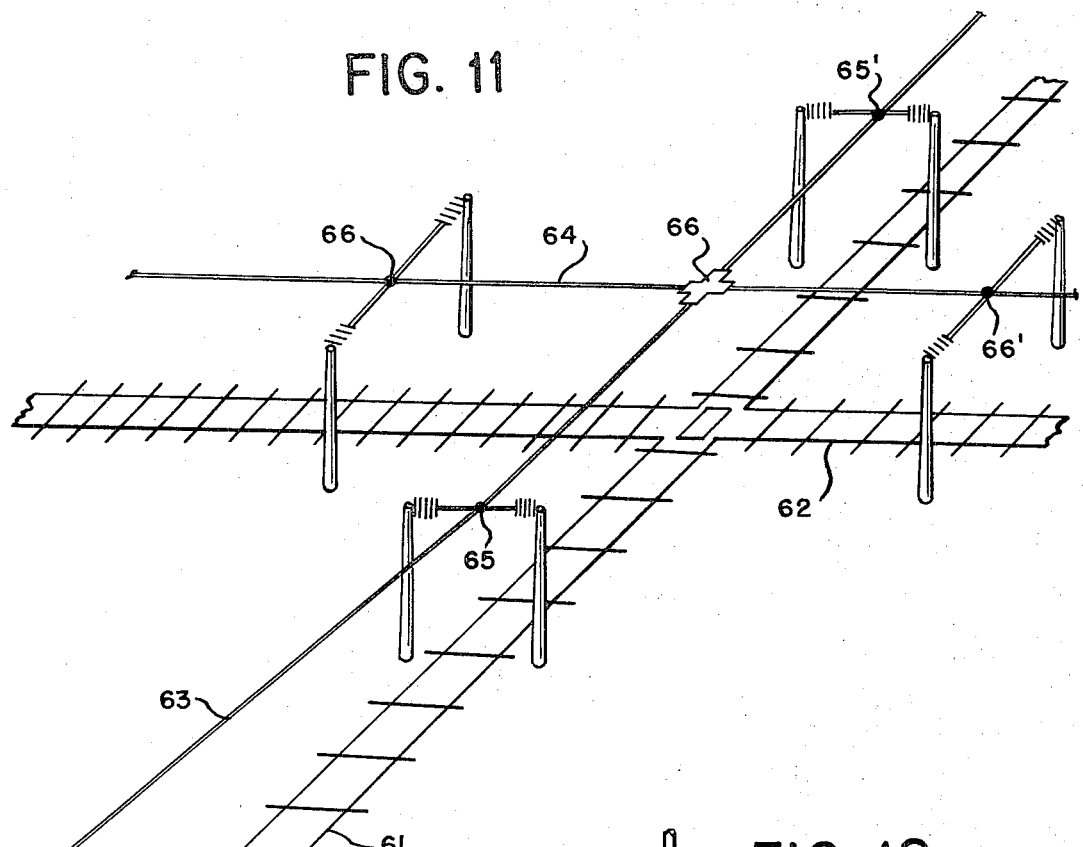
FIG. 11 illustrates a conductor arrangement suitable for a railroad crossing.

Referring to FIG. 1, a pair of railroad tracks 10, 11 of conventional construction are shown diagrammatically. Between the tracks is a set of poles 12 insulatedly supporting a pair of conductors 13, 14 alongside the tracks for delivering electric power to a vehicle. The conductors may be connected together at intervals by spacers 15 if desired.

FIG. 3 is a detail showing an insulator 16 mounted on top of a pole 12, with a cross bar 17 to which conductors 13, 14 are attached in suitable manner.

FIG. 4 shows one way of clamping a conductor in place. Here conductor 13 is a solid conductor with a ridge 18 formed along one side which is held between jaws 19 by a bolt and nut 21, 22. FIG. 4a is similar except here a stranded conductor 13' is shown, and the jaws 19 are shaped to firmly engage a pair of the strands. Conductors of various cross-sectional configuration may be employed as desired, with suitably conforming clamps.

FIG. 2 shows two electrically-powered vehicles 22, 22' traveling in the same or opposite directions on tracks 10, 11. The vehicles may be locomotives, self-powered individual cars, etc. and are shown only diagrammatically since their construction is well-known. Vehicle 22 runs on track 11 and conductor 14 is on the right side of the track. An extensible arm 23 has a traveler 24 mounted thereon for obtaining power from the conductor. Arm 23 is mounted on top of the vehicle on standoff insulators 25, only one of which appears in this view, and is pivotally mounted for movement about an axis 26 extending longitudinally of the vehicle. Thus the arm 23 and traveler 24 can swing angularly over the vehicle to the opposite side thereof. This is indicated for vehicle 22' on track 10 in FIG. 2. Further details will be described later.

In FIG. 1 it is assumed that the spacing of tracks 10 and 11 is sufficient to allow the erection of poles 12 therebetween. If not, two lines of poles could be erected on the outside of the tracks, each line supporting an individual conductor alongside the respective track. Due to the alongside location, relatively simple support means suffices, as will be apparent from FIG. 3, rather than the elaborate support structure commonly employed when the conductor is positioned centrally over the track.

Inasmuch as the arm 23 can move angularly about axis 26, and is extensible, the traveler can move up and down, and in and out, while maintaining engagement with the conductor. Some sagging of the conductor between successive support poles 12 is believed allowable, so that high mechanical tension in the conductor and lengthwise supporting cables between poles are believed to be unnecessary. However, additional support between poles may be employed if desired, but in general may be less elaborate and expensive than for centrally located overhead conductors.

The height of the poles 12 may be selected as desired, taking into account public safety, etc. A height such that the extensible arm 23 is generally horizontal is preferred, but greater heights may be employed if desired. In FIG. 2 the arms 23, 23' are shown somewhat above the horizontal at pole 12, so that they will be approximately horizontal midway between poles at the low point of conductor sag. Accordingly, clamps such as shown in FIGS. 4 and 4a are angled slightly downward in FIG. 3 so that the conductor is supported radially outward of the arm and traveler. For greater pole heights, greater clamp angles may be employed.

Depending on the normal height of the alongside conductor, at road crossings it may be necessary to increase the height to allow adequate clearance for road vehicles. Although this may be accomplished while preserving the alongside location and supporting the conductor at an angle as described above, it may require undue extension of the arm or an arm of greater length. These disadvantages may be avoided by bringing the conductor to a central position over the track so that the arm swings upward to a vertical position over the vehicle.

Referring to FIG. 5, highway 31 is shown crossing the tracks 10, 11. Poles 12 support conductors 13, 14 alongside the tracks as in FIG. 1. As the tracks approach highway 31, overhead conductors 13, 14 gradually move outward and upward so that they move across respective tracks to positions centrally of the tracks and at a higher level to provide the desired clearance. Pairs of poles 32, 33 taller than poles 12, have respective insulated supporting cables 34, 35 extending across the tracks and conductor sections 13', 14' are supported therefrom by suitable clamps.

FIG. 6 shows one form of clamp which may be used. A twisted bar 36 has jaws 39 gripping support cable 34, and jaws 40 gripping the ridge 18 of conductor 14. It will be noted that, with the conductor over the middle of the track, ridge 18 is on top rather than on the side as in FIG. 4 for the alongside location, so that the support means does not interfere with passage of the traveler thereby.

If the conductors need support between a pole 12 and poles 32, one or more additional sets of poles may be employed. Thus in FIG. 5 poles 37 are midway between a pole 12 and poles 32, and have an intermediate height. Supporting cable 38 has clamps supporting the overhead conductors laterally intermediate their alongside location at pole 12 and their central location at poles 32. At poles 37, the clamps are arranged at an angle so as to support the conductor on the side thereof away from the traveler and extensible arm of the vehicle. Thus clamp 40 is turned as shown in FIG. 6a so that conductor 14 is supported on the outside at approximately 45°. For conductor 13 at poles 37, the clamp would be turned to approximately 45° in the opposite direction.

In operation, as a vehicle approaches pole 12 its arm and traveler will extend laterally to engage the alongside conductor, as shown in FIG. 2. Between pole 12 and poles 37 the traveler will gradually move upwards and inwards of the vehicle until the arm 23 is about 45° above the horizontal. Between poles 37 and 32 the traveler will continue to rise and move over to the center of the vehicle, so that the arm 23 will be vertical. After passing poles 33 the arm and traveler will move gradually back to their original position. Intermediate poles and supports 37, 38 may be used between poles 33 and the following pole 12 if required.

Referring to FIG. 7, a switching location is shown. Here track 41 is assumed to continue straight ahead while track 42 turns off to a branch line or siding, etc. Conventional track switches are employed, but are not shown in detail to avoid unnecessary complexity. Elevated conductor 43 is initially supported alongside the track 41, and starts moving upwards and across the track as it approaches the switch point until, at point 44, it is centrally located over the track. The conductor is supported at this point as indicated in FIG. 6. Conductor 43 continues across track 41 until it reaches a conductor frog 45. Advantageously conductor frog 45 is located somewhat beyond the track switching point and intermediate the centers of the tracks, so as to accentuate the pull on the traveler and traveler arm and guide the traveler to the proper outlet leg of the frog depending on whether the vehicle continues on main line 41 or turns onto branch line 42.

At the outlet legs of frog 45, conductor 43 branches to two conductors 43' and 43". The conductors may be led to either side of the respective tracks as desired. As here shown, conductor 43' moves back across main track 41 to a central position at 46, and thereafter to an alongside position at the left of the track corresponding to its initial alongside position. Conductor 43" is led back to a central position 47 over the branch track 42, and thence downward and alongside the right side of the track.

FIG. 8 illustrates a suitable construction for frog 45. At the entering leg or throat 48, the conductor 43 is supported from the top, as indicated in FIG. 9a, and the frame 49 of the frog has two angled guide channels 51, 52 corresponding to the angles of the traveler 24 when the vehicle is moving down respective tracks. FIG. 9a and FIG. 10 show the traveler being on the left side of the vehicle and at a raised level, hence entering guide channel 52. For a vehicle continuing down the main track 41, the traveler will be on its right side and inclined oppositely to that shown, thus entering guide channel 51.

In outlet legs 53 and 54, conductors 43' and 43" are mounted from overhead positions, and the angled guide channels 51, 52 of FIG. 9a separate into correspondingly angled channels 51' and 52' as shown in FIG. 9. For a vehicle traveling down the branch line 42, the traveler will leave the frog along outlet channel 52' as shown in FIG. 9. If the vehicle continues on the main line 41, with its traveler on the right side when it reaches frog 45, it will leave through channel 51' in the outlet leg 53.

If desired, conductor switching frogs can be employed in which runners are mechanically switched from one position to the other automatically as the track is switched, in a manner known in the art. In such case the conductor switching frog may be located overhead at a suitable position with respect to the track switch.

Figure 12:
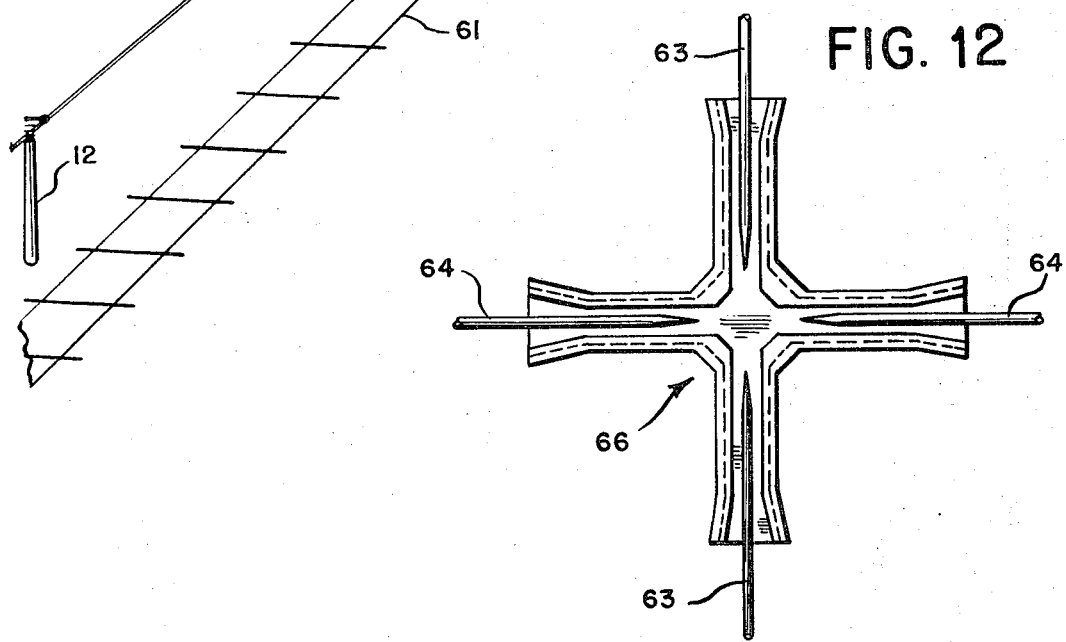
FIG. 12 is a bottom view of the frog used in FIG. 11.

FIG. 11 illustrates a railroad crossing which, although not common, may sometimes occur. Here tracks 61 and 62 cross each other with suitable crossing construction, not shown in detail to avoid unnecessary complexity. At locations remote from the crossing, conductors 63, 64 are supported alongside the respective tracks as previously described. At the crossing the conductors are raised and suspended centrally over the respective tracks at points 65, 65' and 66, 66' in a manner similar to that described for FIG. 5, with clamps as shown in FIG. 6. Additional support poles between alongside and central positions may be employed if desired, as previously described. At the junction a four-legged frog 66 is employed, and a bottom view thereof is shown in FIG. 12. Conductors 63 and 64 are supported from the top by the frame of the frog and each leg is provided with a guide channel similar to one of the channels in FIG. 9, except horizontally disposed.

Figure 13:
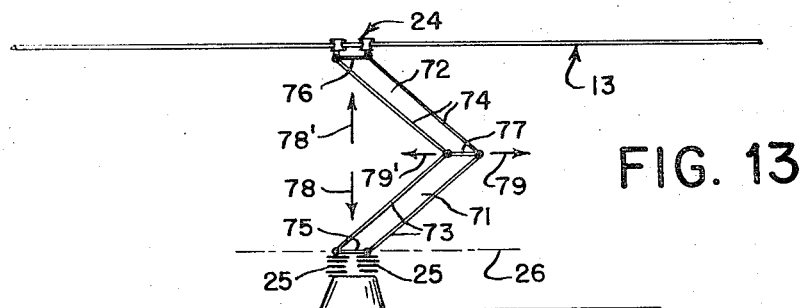
FIG. 13 is a side view of a vehicle with an articulated arm and traveler engaging a conductor centrally located over the track.
Figure 14:
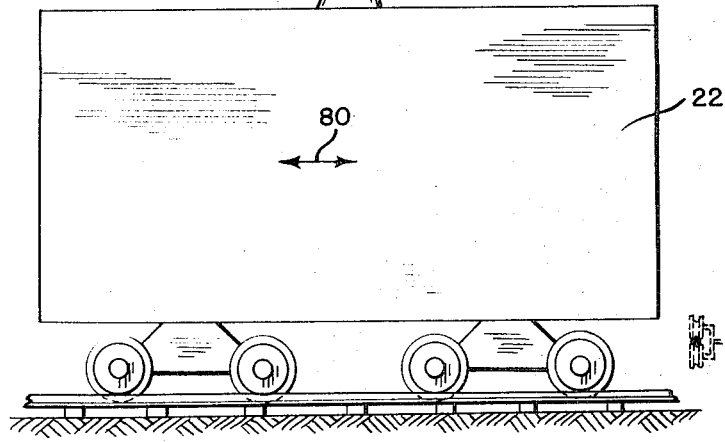
FIG. 14 is a top view of a vehicle with the traveler engaging a conductor alongside the track.
Figure 15:
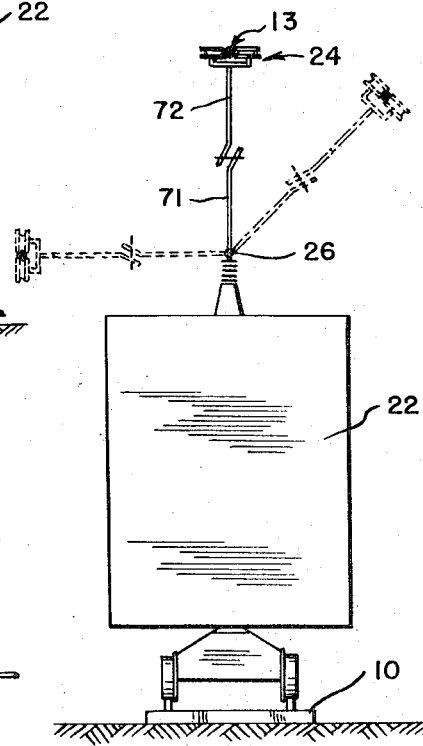
FIG. 15 is an end view of the vehicle illustrating various positions of the articulated arm and traveler.

FIGS. 13–15, inclusive, illustrate an articulated arm suitable for mounting the traveler on the vehicle, and FIGS. 16–21 illustrate details thereof.

Referring to FIG. 13, the articulated arm comprises two jointed sections 71, 72, each comprising a pair of spaced parallel rods 73, 74 with respective end joining members 75, 76 and a common mid joining member 77, forming two parallelogram sections. The ends of the rods are pivoted for movement in the plane of the parallelogram sections, thus allowing movement of the end joining member 76 toward and away from member 75, as indicated by arrows 78, 78'. Such movement will be accompanied by movement of the mid joining member 77 longitudinally of vehicle 22 as indicated by arrows 79, 79'. Joining member 75 is mounted on standoff insulators 25, and is pivoted for movement about axis 26 extending longitudinally of the vehicle. The traveler 24 is mounted on the outer joining member 76, which remains parallel to axis 26 as it moves toward or away from the axis or swings thereabout.

In FIG. 13 the traveler 24 and articulated arm are shown in an overhead central position with respect to the vehicle 22, and it will be apparent that the traveler can move up and down to accommodate different vertical heights of the power conductor 13, while remaining in engagement therewith.

FIG. 14 shows conductor 13 mounted alongside the track, with the articulated arm extending laterally of the vehicle. Due to the articulation described above, traveler 24 can follow lateral and vertical excursions of conductor 13 while remaining in engagement therewith.

FIG. 15 shows several positions of the traveler and articulated arm as viewed from the end of the vehicle. As will be apparent, the traveler 24 can move from one side of the vehicle through a central position to the other side of the vehicle, the articulated arm bending as required to allow the traveler to maintain engagement with the power conductor 13. It will also be noted that the orientation of the traveler with respect to a radius to the axis of rotation 26 of the arm remains the same as the traveler and arm move to various angular positions about axis 26.

In FIGS. 13 and 14, the arm sections are shown in a bent knee configuration, and it is particularly contemplated that the vehicle will be moving toward the right, with the knee pointing of the direction of movement. However, movement of the vehicle in the opposite direction is possible, as indicated by the double-headed arrow 80. It is preferred to select the length of the arm sections and the spacing of the conductor 13 from the axis of rotation 26 so that the bent knee configuration is maintained during normal operation.

Figure 16:
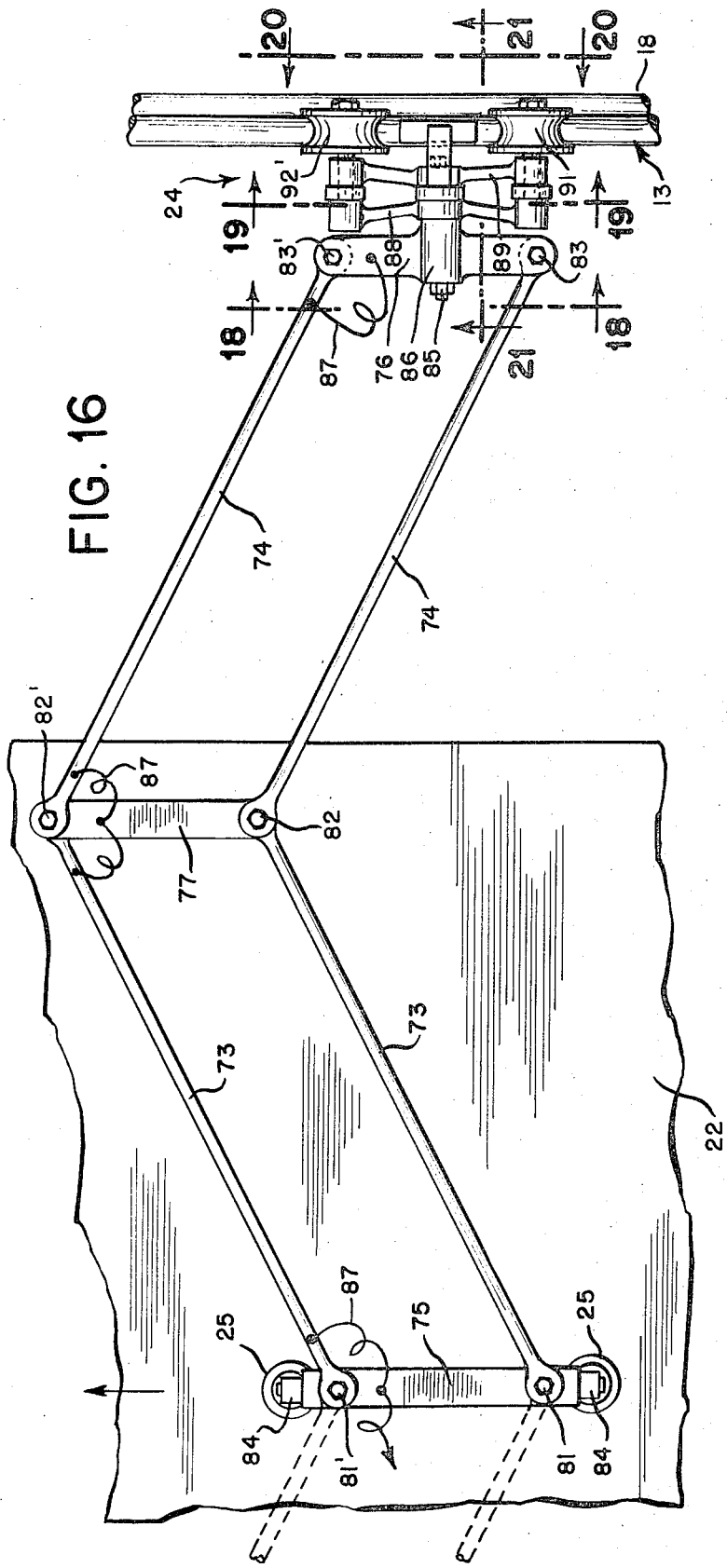
FIG. 16 is a plan view of the articulated arm and traveler with the arm extending horizontally.
Figure 17:
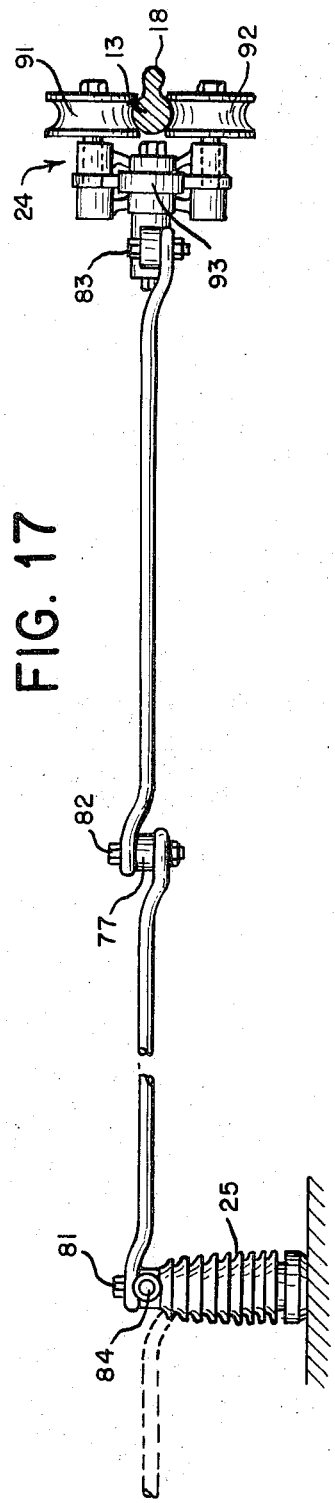
FIG. 17 is an elevation view of the arm and traveler of FIG. 16.
Figure 18:
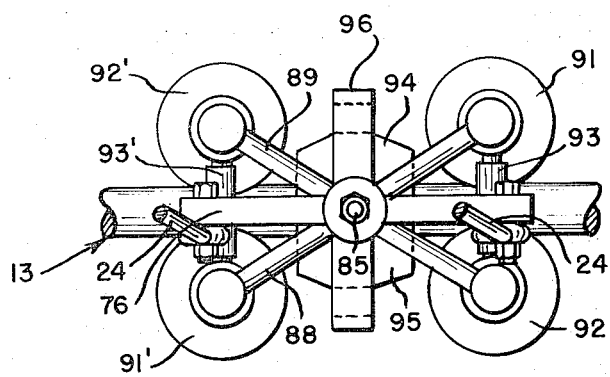
FIGS. 18–21, inclusive, are views of the traveler taken along the lines 18—18 through 21—21 of FIG. 16, respectively.
Figure 19:
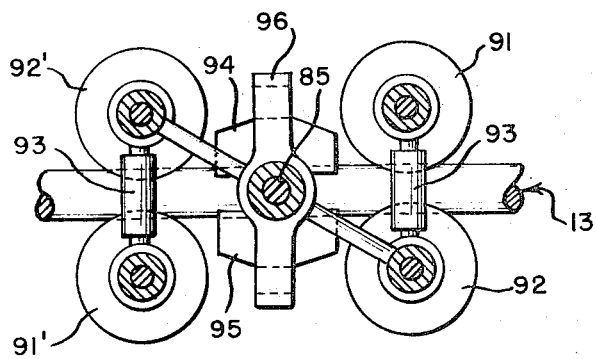
Figure 20:
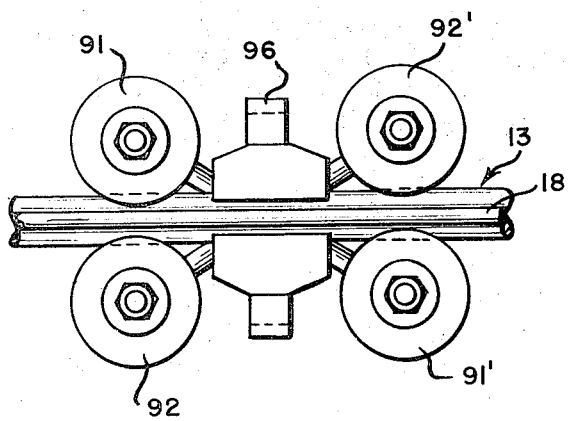
Figure 21:
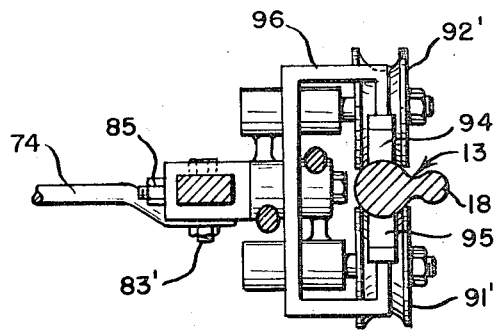

Referring to FIGS. 16 and 17, parallel rods 73 are pivoted to the inner joining member 75 at 81, 81' and to the mid joining member 77 at 82, 82'. Rods 74 also are pivoted to the mid joining member 77 at 82, 82' and to the outer joining member 76 at 83, 83'. Inner joining member 75 is pivoted on a longitudinally extending bearing 84 mounted on standoff insulators 25. A shaft 85 is mounted in a central enlargement 86 of the outer joining member 76, and supports the traveler 24. Bonding wires 87 may be used to assure good electrical conductivity from the traveler to the inner joining member 75, and power may be delivered from member 75 to the vehicle in any suitable manner.

Referring to FIGS. 16–21, inclusive, details of the traveler 24 are shown. Pivotally mounted on shaft 85 are a pair of crossed arms 88 and 89, each carrying a pair of grooved wheels 91, 91' and 92, 92' rotatably mounted at the ends thereof. Tension devices 93, 93' attached to the ends of arms 88, 89 bias the wheels against power conductor 13 so as to produce a contact pressure which serves to hold the traveler in engagement with the conductor and establish good electrical contact. Tension devices 93, 93' may be spring or hydraulic operated, etc.

With the pairs of wheels 91, 92 and 91', 92' spaced longitudinally of the conductor, the traveler will be guided longitudinally by the conductor, so that it will follow lateral and vertical changes in the position of the conductor, as described in previous figures. Also, with the plane of the wheels perpendicular to the plane of the arm assembly, and hence perpendicular to the radius to the axis of rotation 26, the traveler can follow changes in position of the conductor in either direction of movement of the vehicle along the track.

If greater electrical contact area is required, sliding contact shoes 94, 95 may be employed. These are mounted on a frame 96 attached to shaft 85 and spring-pressed against conductor 13 by suitable means (not shown).

With the power conductor supported in the simple manner described hereinbefore, without high mechanical tension, the traveler may force or "milk" the slack in the conductor toward the forward end of a span, particularly at high speeds. If this becomes troublesome, one or more small motors may be used to drive one or more of the contact wheels, preferably synchronized with the speed of the vehicle, so as to reduce the drag of the traveler on the conductor.

To avoid excessive looseness in the articulated arm, and facilitate passing a switching point as described for FIG. 7, resilient biasing may be employed at the knee of the arm to urge it to the bent position, or friction bearings may be employed, etc., so as to impose a moderate degree of restraint to the arm movements.

Instead of using a single articulated arm as described hereinbefore, a double articulated arm may be employed to provide additional stability if required. Thus, in FIG. 13, a second articulated arm with its knee extending toward the left may be added, end joining members 75 and 76 being common to both arms.

The invention has been described in connection with specific embodiments thereof. It will be understood that many changes in detail are possible within the spirit and scope of the invention.

I claim:

1. In an electric railroad system, the combination which comprises
    a. an elevated conductor having sections mounted alongside a track and sections extending over the track and thence alongside the track,
    b. and an electrically-powered vehicle adapted to run on said track and having an overhead traveler mounted on an extensible arm for obtaining power from said elevated conductor,
    c. said extensible arm being pivotally mounted on top of said vehicle for movement about an axis of rotation extending longitudinally of the vehicle,
    d. said traveler including means for engaging said conductor and holding the traveler in guided relationship with the conductor,
    e. said extensible arm being adapted for movement of said traveler toward and away from the axis of rotation of the arm,
    f. whereby said traveler can move to either side of the vehicle and to a central position to follow changes in position of said elevated conductor while remaining in engagement therewith.

2. Apparatus in accordance with claim 1 in which said sections of the conductor extending over the track rise to a higher level than the alongside level of the conductor.

3. Apparatus in accordance with claim 1 in which said traveler includes grooved means for engaging said conductor on opposite sides thereof and means for resiliently biasing the grooved means against the conductor.

4. Apparatus in accordance with claim 1 in which said traveler includes pairs of longitudinally spaced grooved wheels for engaging said conductor on respectively opposite sides thereof and means for resiliently biasing said wheels toward the conductor to maintain the traveler in guided relationship with the conductor.

5. Apparatus in accordance with claim 1 in which said traveler and arm are designed and adapted to maintain substantially the same orientation of the traveler with respect to a radius to said axis of rotation of the arm as the traveler moves between side and central positions of the vehicle and toward and away from said axis of rotation.

6. Apparatus in accordance with claim 5 in which said traveler includes grooved means for engaging said conductor on opposite sides thereof in a plane substantially perpendicular to a radius to said axis of rotation of the arm, and means for resiliently biasing the grooved means against the conductor.

7. Apparatus in accordance with claim 6 in which supports for said elevated conductor are attached thereto on the side thereof away from said traveler and arm in alongside and central positions of the conductor and in positions therebetween.

8. Apparatus in accordance with claim 6 in which said railroad system includes a track switching point for switching vehicles from one track to another, a conductor frog mounted beyond said track switching point intermediate the centers of said tracks, said frog having a pair of guide channels at respective angles from the horizontal corresponding to the traveler angles of vehicles traveling down respective tracks.

9. In an electric railroad system, the combination which comprises
   a. an elevated conductor having sections mounted alongside a track and sections extending over the track and thence alongside the track,
   b. and an electrically-powered vehicle adapted to run on said track and having an overhead traveler mounted on an articulated arm for obtaining power from said elevated conductor,
   c. said traveler having grooved means for engaging said conductor on respectively opposite sides thereof and resiliently biased toward the conductor to maintain the traveler in guided relationship with the conductor,
   d. said articulated arm being pivotally mounted on top of said vehicle about an axis of rotation extending longitudinally of the vehicle for angular movement between either side of the vehicle and a central position over the vehicle,
   e. said articulated arm having at least two jointed sections allowing movement of said traveler toward and away from the axis of rotation of the arm and designed and adapted to maintain substantially the same orientation of the traveler with respect to a radius to the axis of rotation as the traveler moves between side and central positions of the vehicle and toward and away from the axis of rotation to follow changes in position of said elevated conductor while remaining in engagement therewith.

10. Apparatus in accordance with claim 9 in which the grooved means of said traveler comprises pairs of longitudinally spaced grooved wheels for engaging opposite sides of the conductor, the plane of said wheels being substantially perpendicular to a radius to said axis of rotation of the arm.

11. Apparatus in accordance with claim 10 in which said jointed sections of the articulated arm each comprise a pair of spaced parallel rods with respective end joining members and a common mid joining member forming two parallelogram sections, said rods being pivoted to said joining members for movement in the plane of said parallelogram sections, said traveler being mounted on one of said end joining members and the other end joining member being pivotally mounted on top of said vehicle about said axis of rotation of the arm, the length of said sections and the spacing of said elevated conductor from said axis of rotation being predetermined to maintain said sections in a bent knee configuration during normal operation.

12. Apparatus in accordance with claim 10 in which supports for said conductor are attached thereto on the side thereof away from said traveler and articulated arm in alongside and central positions of the conductor and in positions therebetween.

* * * * *